United States Patent
Cicconi, III

(10) Patent No.: US 7,338,092 B1
(45) Date of Patent: Mar. 4, 2008

(54) QUICK-RELEASE CONNECTOR FITTING

(76) Inventor: David Lee Cicconi, III, 4657 Wilson La., Concord, CA (US) 94521

( * ) Notice: Subject to any disclaimer, the term of this patent is extended or adjusted under 35 U.S.C. 154(b) by 96 days.

(21) Appl. No.: 11/188,525

(22) Filed: Jul. 25, 2005

(51) Int. Cl.
*F16L 37/00* (2006.01)
*F16L 35/00* (2006.01)

(52) U.S. Cl. .......................... 285/305; 285/1; 285/319; 285/321; 285/921

(58) Field of Classification Search ................ 285/319, 285/321, 921, 305, 1
See application file for complete search history.

(56) References Cited

U.S. PATENT DOCUMENTS

| | | | | |
|---|---|---|---|---|
| 2,952,482 A | * | 9/1960 | Torres | 285/313 |
| 3,207,535 A | * | 9/1965 | Wilson | 285/86 |
| 3,428,340 A | * | 2/1969 | Pelton | 285/95 |
| 3,922,011 A | * | 11/1975 | Walters | 285/277 |
| 5,540,250 A | * | 7/1996 | Mullins | 137/77 |
| 5,855,399 A | * | 1/1999 | Profunser | 285/305 |
| 5,882,511 A | * | 3/1999 | Blomquist | 210/167.31 |
| 5,884,943 A | * | 3/1999 | Katzer et al. | 285/38 |
| 6,682,106 B2 | * | 1/2004 | Parker | 285/282 |
| 7,021,669 B1 | * | 4/2006 | Lindermeir et al. | 285/86 |
| 2002/0036406 A1 | * | 3/2002 | Parker | 285/282 |

FOREIGN PATENT DOCUMENTS

DE 1775302 * 6/1967

OTHER PUBLICATIONS

Maryland Metrics, retrieved Apr. 12, 2007, web page: http://mdmetric.com/tech/pipe0010.htm.*
Maryland Metrics, retrieved Apr. 12, 2007, web page: http://mdmetric.com/tech/metnptcomp.htm.*
ASTM, retrieved Apr. 12, 2007, web page: http://www.astm.org/cgi-bin/SoftCart.exe/DATABASE.CART/REDLINE_PAGES/F2261.htm?E+mystore.*

* cited by examiner

*Primary Examiner*—Daniel P. Stodola
*Assistant Examiner*—Jay R Ripley
(74) *Attorney, Agent, or Firm*—Charles L. Thoeming

(57) ABSTRACT

A plastic rift connector fitting comprises an annular housing, water line fitting, and sleeve components for pressurized water systems. The housing has a plurality of locking mechanisms to quickly lock and release the water line fitting. A flange and O-ring on the water line fitting stabilize the water line fitting connection to the housing for pressures up to 250 psi. The sleeve encloses the housing/fitting connection to prevent accidental release of water line fitting.

7 Claims, 3 Drawing Sheets

QUICK-RELEASE CONNECTOR FITTING

CROSS-REFERENCES TO RELATED APPLICATIONS

This application claims the benefit of the date of conception of the disclosed invention under Disclosure Document No. 535375 at least as early as 25 Jul. 2003.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

1. Field of the Invention

This invention relates generally to quick-release fittings, and in particular, to a rift connector fitting to be used for removing or replacing control valves for pressurized watering systems without the necessity of cutting, measuring, or gluing, or the implements to achieve these actions.

2. Description of the Related Art

The following patents are believed to be representative of the present state of the art: U.S. Pat. No. 6,491,235 B1, issued Dec. 10, 2002; U.S. Pat. No. 6,484,765 B1, issued Nov. 26, 2002; U.S. Pat. No. 6,026,851, issued Feb. 22, 2000; U.S. Pat. No. 5,871,156, issued Feb. 16, 1999; and U.S. Pat. No. 4,109,672, issued Aug. 29, 1978.

BRIEF SUMMARY OF THE INVENTION

A quick disassembly of sprinkler control valves in pressurized water systems is important to minimize labor and material costs when such valves fail or otherwise need replacement. An initial critical step in valve replacement in the art is cutting the failed valve out of the water line system, measuring replacement line splices, and gluing the replacement line and valve arrangement into place. These measuring, cutting and gluing steps require precision and time in order to adequately satisfy operational requirements of pressurized watering systems.

In accordance with the invention claimed, one embodiment of rift connector fitting is attached to both ends of a standard anti-syphon valve, control valve, or straight, inline valves or "L" shaped valves designed primarily for residential and light commercial use, such as the Eletic Globe™ 2400, 2500, and 2600 Series, and 2711 Models, 2713 Models, or similar apparatus.

The main fitting of an embodiment of the present invention comprises an annular piece having nominal threading on one end to be attached to a standard valve opening having reciprocal threads. The other end is sized to receive and secure a water line connector element or extension threaded onto inlet and outlet water lines to the valve. The main fitting member of an embodiment of the present invention has a plurality of locking mechanisms to engage and hold the water line connector element or extension. These locking mechanisms are held in place by a spring assembly which locks and releases the fitting from a flange on the water line connector element or extension. a stabilizing O-ring on the water line connector element or extension stabilizes the connection to the main fitting member and keeps the fitting from leaking. A safety clip/sleeve assembly encloses the locking mechanisms to eliminate accidental release of the connector fitting during pressurized operation.

The present invention for rift connector fitting generally comprises a housing with first and second open ends, first and second cylindrically-shaped inner walls of differing predetermined diameters and an annular tapered interior connecting the first and second cylindrically-shaped inner walls. As such, a housing interior is defined extending between the first and second open ends and having a central longitudinal axis. The housing further comprises and exterior portion having a female end corresponding to the larger cylindrically-shaped inner wall and a threaded male end corresponding to the smaller cylindrically-shaped inner wall. The housing exterior further provides a first external circular shaped rib extending outward from the housing to a predetermined diameter corresponding to the boundary between the annular tapered interior wall and the smaller cylindrically-shaped inner wall, a flanged end extending outward from the open female end, and a second external circular shaped rib extending outward from the housing to a predetermined diameter between the female end flange and first external circular shaped rib.

Added to this housing, and sized suitably to fit therein, is a water line fitting comprising first and second open ends. The water line fitting further comprises a cylindrically-shaped inner wall of diameter sized to the smaller housing inner wall diameter defining a fitting interior extending between the first and second open ends having a central longitudinal axis. One open end inner wall of the water line fitting further comprises screw threads for a predetermined length of the inner wall defining a water line fitting female open end. The water line fitting exterior comprises a male end sized to be insertably received into the housing female open end, and the exterior further comprises an external circular shaped rib extending outward from the fitting male end exterior surface to a predetermined diameter. A circular recess extends inward on the exterior surface from the male end surface between the external circular shaped rib and the open end corresponding to the male end sized to receive and secure an O-ring. A suitably sized standard O-ring is disposed on the male end within the circular recess.

An end sleeve for the housing comprises first and second open ends, connected first and second cylindrically-shaped inner walls of differing predetermined diameters defining the sleeve interior extending between the first and second open ends, and a central longitudinal axis. The larger sleeve open end is sized to receive and enclose the housing female end up to the second external circular shaped rib. The smaller sleeve open end is sized to receive and enclose the water line fitting exterior male end leaving sufficient space for the male end to freely move therein along the sleeve longitudinal axis. The cylindrical end sleeve exterior comprises a semi-circular recess extending inwards and sized to receive and hold a clip. The recess further comprises two ends and two openings from the exterior through to the to the larger cylindrically-shaped inner wall, with one opening located at one end of the semi-circular recess and the other located at the other recess end.

Apparatus assembly means for locking the water line fitting into the housing thereby connecting the fitting interior and the housing interior in water tight communication for pressures up to 150 pounds per square inch and means for locking the end sleeve onto the housing and water line fitting connection are provided. This apparatus assembly means for locking the water line fitting into the housing further comprises a plurality of locking mechanisms spatially oriented equidistant one from the other along a plane perpendicular to the central longitudinal axis, wherein each mechanism comprises a detent head accessible from the housing exterior and a deformable lock tab having elastic memory accessible from the housing larger interior wall at a predetermined distance from the housing female open end. In this fashion, when the water line fitting is insertably fitted into the housing female end the circular shaped rib communicates with the lock tabs and is thereby locked into the housing and the O-ring communicates with the annular tapered interior wall. Each detent head comprises a recess sized to receive a circular shaped detent locking spring.

Apparatus assembly means for locking the end sleeve onto the housing and water line fitting connection comprises an arcuate resilient clip sized to be received into and reside in the sleeve exterior recess. The clip further comprises two arms sized to extend through the sleeve and securely engage the housing exterior.

An embodiment of the present invention is constructed of high strength, ultra-violet resistant plastic rated to withstand water pressures in the range from 100 pounds per square inch (psi) to 250 psi, depending upon the sized rift connector fitting. Embodiments of the present invention would be sized for ¾ inch, 1 inch, 1½ inch and 2 inch, 20 mm, 25 mm, 40 mm, and 50 mm standard diameter water line and valve inlet/outlet dimensions.

It is, therefore, one object of this invention to provide a rift connector fitting that is easily positioned on either end of standard anti-syphon valves, control valves, inline valves, or "L" shaped valves designed primarily for residential and light commercial use, such as the Eletic GlobeT™ 2400, 2500, and 2600 Series, and 2711 Models, 2713 Models, or similar apparatus.

A further object of the present invention is to provide a rift connector fitting that allows for quick and easy replacement of a(n) standard anti-syphon valve, control valve, inline valve, or "L" shaped valve designed primarily for residential and light commercial use, such as the Eletic Globe™ 2400, 2500, and 2600 Series, and 2711 Models, 2713 Models, or similar apparatus.

It is yet another object of this invention to provide a rift connector fitting that prevents leaking during pressurized operation.

It is a further object of this invention to provide a rift connector fitting that protects against accidental release during pressurized operation.

Related features, objects and advantages of the present invention will be apparent with reference to the following description and accompanying drawings.

DETAILED DESCRIPTION OF THE INVENTION

Figure 1:
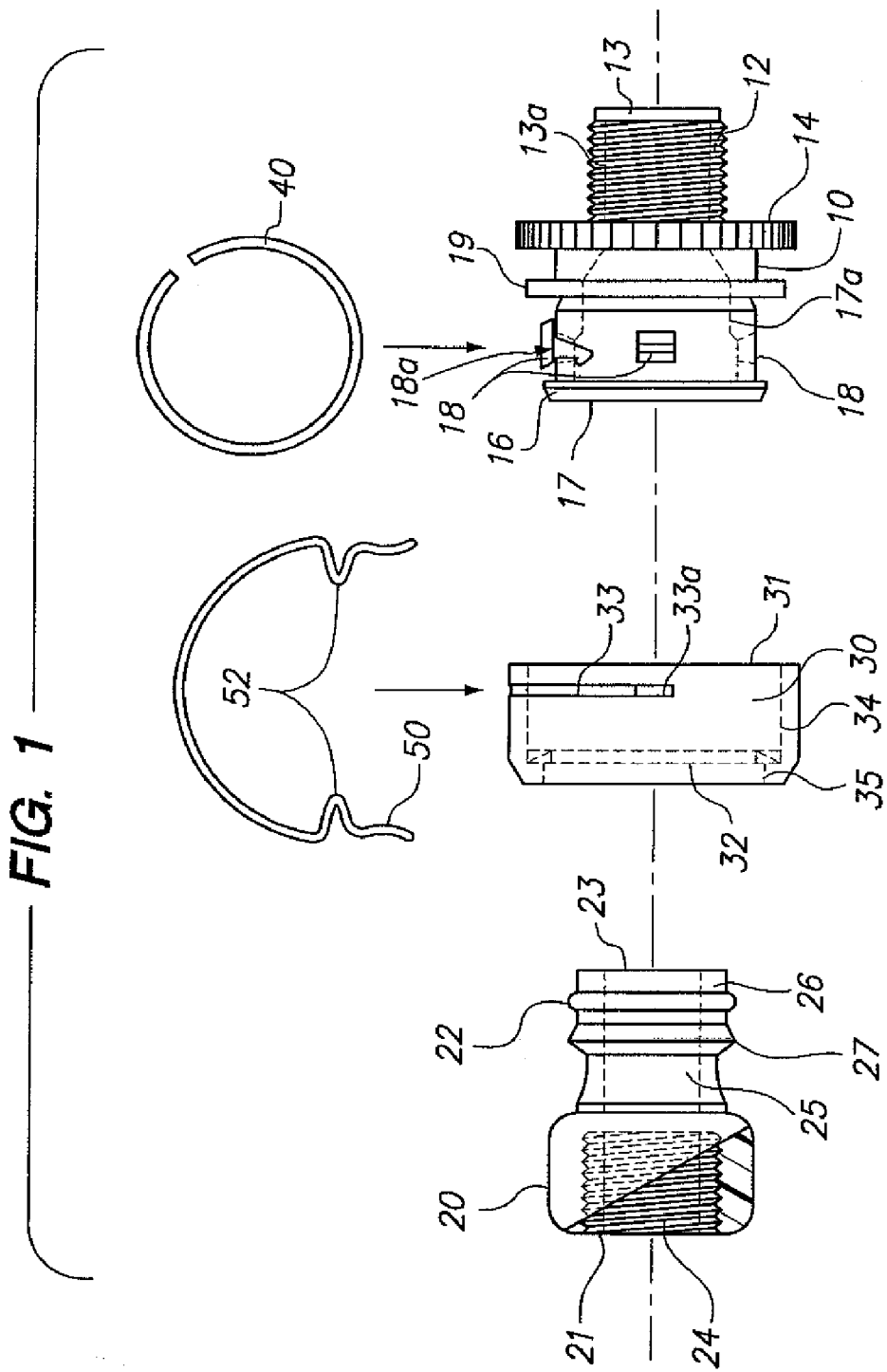
FIG. 1 is an exploded view of an embodiment of the present invention depicting, in combination, (i) a side elevational view of a typical water line connector element 20 including O-ring 22 to be fitted into one end of the rift connector main fitting 10, (ii) a side elevational view the rift connector main fitting 10 with locking mechanisms 18, (iii) a front elevational view of safety clip element 50, (iv) a side elevational view of the female end sleeve 30 of the rift connector main fitting 10 with safety clip recess 33, and (v) a front elevational view of spring assembly 40 to secure the locking mechanisms 18 of the rift connector main fitting 10.
Figure 2:
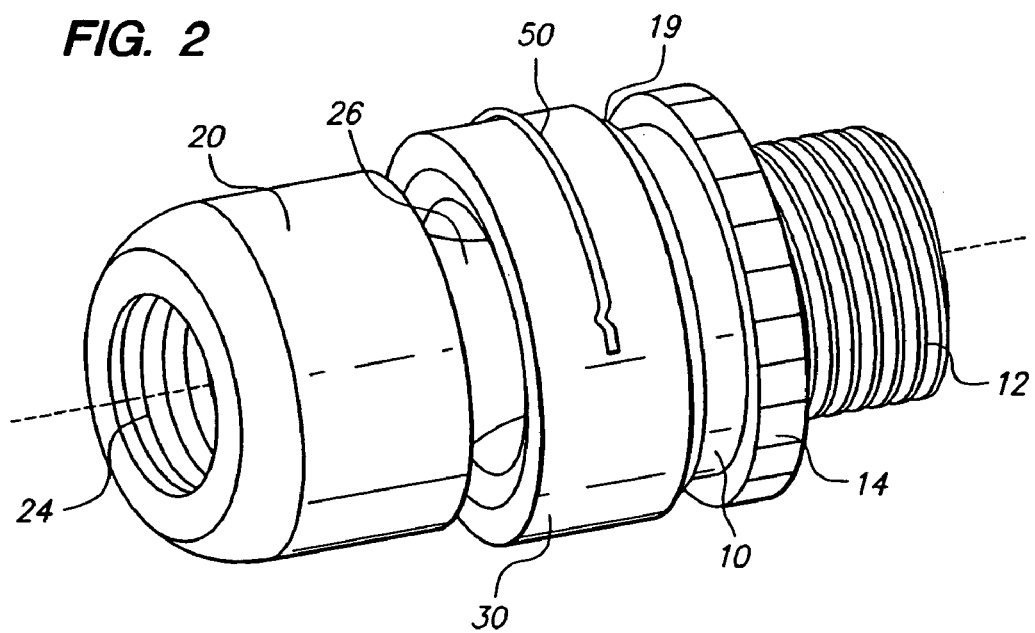
FIG. 2 is a perspective view of the assembled elements of an an embodiment of the present invention depicting, in combination, a typical water line connector element 20 including female threaded open end 24 and male end 26 fitted into one end of the rift connector main fitting 10 with end sleeve 30 and safety clip 50 in place.
Figure 3:
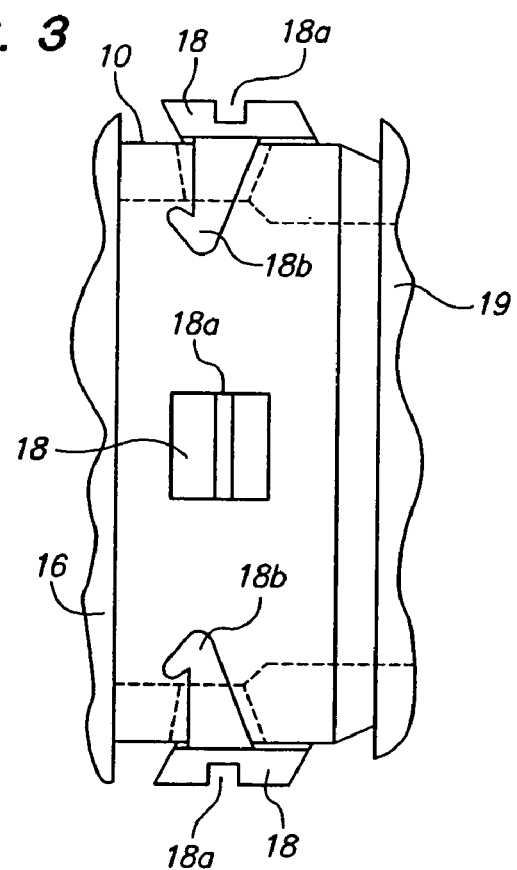
FIG. 3 is an exploded detail elevational view of an embodiment of the present invention depicting the connector main fitting 10 of FIG. 1 between female end 16 and main fitting flange 19 depicting three of the four detent locking mechanisms 18 and the channel 18a and locking tab 18b elements of the detent locking mechanisms 18.

With reference to the drawings, a molded plastic rift connector main fitting 10 housing for connecting fluid conduit line to a valve according to an embodiment of the present invention comprising housing open annular ends 13, 17. The fitting 10 housing has a first cylindrically-shaped inner wall 17a of predetermined diameter that tapers annularly to a second cylindrically-shaped inner wall 13a of predetermined diameter less than the first cylindrically-shaped inner wall 17a defining a fitting 10 housing interior extending between the open annular ends 13, 17 and having a longitudinal central axis. The larger open end 17 has an end flange 16 and four locking mechanisms 18 each of which comprises a recessed detent 18a and a lock tab 18b. Each detent locking mechanism 18 extends through the fitting 10 housing such that the detent top concave recess 18a is accessible from the fitting 10 housing exterior and the lock tab 18b is accessible from the fitting 10 housing interior, FIG. 3. The locking mechanisms are aligned in ninety-degree orientation, one to the other immediately adjacent mechanisms, on a plane perpendicular to the longitudinal central axis of the fitting 10 housing interior.

Figure 4:
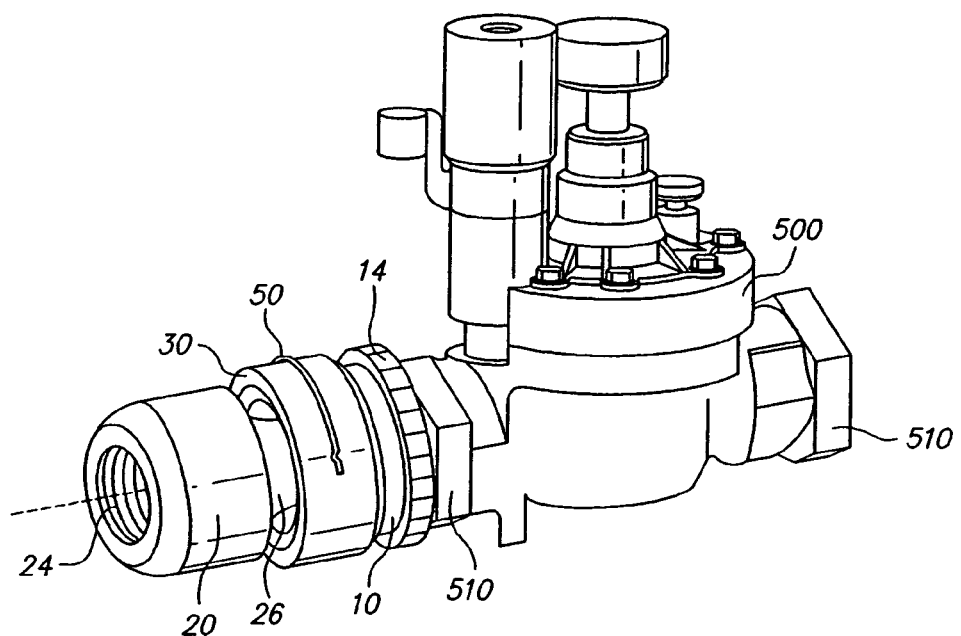
FIG. 4 is a perspective view of the embodiment of the present invention of FIGS. 1 and 2 depicting threaded communication of the connector main fitting 10 threaded male end 12 with a typical valve 500 [Electic Globe™ 2500TF] at the valve threaded female end 510.

The rift connector main fitting 10 housing further comprises a male end with screw threads 12 formed thereon sized to correspond to a female threaded inlet portion 510 of a typical valve, such as the Eletic Globe™ 2400, 2500 500, and 2600 Series, and 2711 Models, 2713 Models, or similar apparatus, and be secured thereto using a standard washer fitting in the art [not shown] between the female threaded inlet 510 and a circular shaped rib serving as an external fitting ring 14 to provide support for a standard waher fitting [not shown] for a water tight seal between main fitting 10 housing and the valve 500, FIG. 4. The external fitting ring 14 also serves to assist in threading the main fitting 10 housing to the valve 500. Another fitting ring 19 serves to position and securely communicate with one end of the fitting 10 housing end sleeve 30.

The end sleeve 30 comprises a molded plastic, cylindrically shaped end sleeve having housing open ends 31, 32. The end sleeve further defines a first cylindrically shaped inner wall 34 and a second cylindrically shaped inner wall 35 defining a sleeve interior extending between sleeve open ends 31, 32. The sleeve first cylindrically shaped interior inner wall 34 has a diameter sized to receive and snugly fit around the larger open end 17, flange 16 and four detent locking mechanisms 18 of the main fitting 10 housing. The sleeve second cylindrically shaped interior inner wall 35 has a diameter sized to receive and fit around the water line fitting 20 open end 21 of the water line fitting 20 female end with screw threads 24 when the water line fitting 20 has been connected to the main fitting 10 housing.

A metal, resilient spring arcuate clip 50 having two arms 52 is provided as means to secure the sleeve 30 to the main fitting 10 housing.

A recess 33 with openings 33a from the sleeve 30 exterior surface to the sleeve interior is sized to receive the clip 50 and secure the sleeve 30 to the main fitting 10 housing by each clip arm 52 extending through the corresponding opening 33a and communicating securely with the main fitting 10 housing when the clip 50 is positioned in the recess 33.

The water line fitting 20 comprises a molded plastic, cylindrically shaped end sleeve having housing open ends 21, 23. The water line fitting 20 further defines a cylindrically shaped inner wall 35 defining a water line fitting interior extending between open ends 21, 23. The water line fitting interior has a diameter sized according to the predetermined diameter of the second cylindrically-shaped inner wall 13a of the main fitting 10 housing. One open end 21 of the water line fitting 20 comprises a female end with screw threads 24 formed within the inner wall 25 sized to correspond to a male threaded portion of a typical water line. The other open end 23 is sized to insert into the female end 17 of the main fitting 10 housing and comprises a circular recess sized to receive a stabilizing ring or standard O-ring, and an O-ring 22 sized to be received by and fit securely on the circular recess of the external water line fitting 20. This stabilizing ring or standard O-ring 22 stabilizes the water line fitting 20 to the main fitting 10 housing at annularly tapered portion between the first cylindrically-shaped inner wall 17a and second cylindrically-shaped inner wall 13a and provides a water tight seal for pressures up to 150 pounds per square inch.

The external flange 27 on the water line fitting 20 is sized to communicate with and lock securely into the lock tab 18b of each locking mechanism 18 of the main fitting 10 housing, and thereby stabilize the connection of the water line fitting 20 to the main fitting 10 housing. When the external flange 27 is engaged by the detent locking mechanisms 18, the circular shaped, metal resilient spring 40 is positioned around the locking mechanisms 18 to reside within the concave detent recesses 18a of each mechanism 18, stabilizing and holding the water line fitting 20 securely within the main fitting 10 housing.

Embodiments of the present invention are suitable as kits for retrofitting onto existing watering system valves, or for original equipment manufacture and sale with valves according to the principles of the present invention.

Embodiments of the present invention would be sized for ¾ inch, 1 inch, 1; inch and 2 inch, 20 mm, 25 mm, 40 mm, and 50 mm standard diameter water line and valve inlet/outlet dimensions.

The main fitting 10 housing, water line fitting 20, and end sleeve 30 are made of plastics or metals selected in consideration of the intended field of application of the rift connector fitting and it is significant in this respect whether the tubular end portions should be rigid or flexible. It has been found that the suitable plastics include, inter alia, ultra-violet resistant poly-vinylchoride, polyethersulfones, and polyetherketones with pressure ratings up to 250 psi, for the water line connector/main fitting connection and all fitted apparatus elements, depending upon connector sizing. For ¾ inch, 1 inch, 20 mm, and 25 mm, and 40 mm diameter water line and valve inlet/outlet dimensions, the water line connector/main fitting connection and all fitted apparatus elements are rated up to 150 psi. It will be understood that these components can be made of materials other than plastic, such as brass or copper, although ultra-violet resistant poly-vinylchoride is preferred.

It is further understood that the application of the invention is not restricted to the field which has been explained with reference to the illustrated embodiment. The invention can be applied to advantage not only to watering system valve connections, but to connections between electric cables, machine elements, and the like. Besides, the main fitting 10 housing locking mechanism 28 detents are not restricted to the preferred embodiment number [four] and spatial orientation [ninety-degree orientation, one to the other immediately adjacent mechanisms], but could number three detents with one hundred twenty degree spatial orientation, one to the other immediately adjacent mechanisms on the same plane perpendicular to the defined central longitudinal axis of the main fitting 10 housing, or similarly modified detent number and arranged orientation.

As can be seen from the foregoing, a the present invention can be installed and utilized to quickly replace or substitute a plurality of types of control valves, anti-syphon valves, inline valves or L shaped inline valves within a pressurized water system by snapping the fittings 10, 20, and 30 together or releasing the fittings using the locking mechanisms 18, stabilizing ring 22, flange 27, locking spring 40, and clip 50. Similarly, existing water delivery systems can be retrofitted to include the present invention on either side of system valves.

For the purposes of promoting an understanding of the principles of the present invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the present invention as illustrated therein being contemplated as would normally occur to one skilled in the art to which the invention relates.

It should be understood that the invention is not intended to be limited by the specifics of the above-described embodiments, but rather by the accompanying claims.

I claim:

1. A quick-release connector fitting comprising, in combination:
    an ultra-violet resistant polyvinylchloride housing comprising a central longitudinal axis, first and second open ends, first and second cylindrically-shaped inner walls of differing predetermined diameters about the central longitudinal axis, and an annular tapered interior connecting the first and second cylindrically-shaped inner walls defining a housing interior extending between the first and second open ends;
    a housing exterior comprising a central longitudinal axis, a female end corresponding to the larger cylindrically-shaped inner wall and a threaded male end corresponding to the smaller cylindrically-shaped inner wall, a first external circular shaped rib extending outward from the housing to a predetermined diameter about the central longitudinal axis corresponding to the boundary between the annular tapered interior wall and the smaller cylindrically-shaped inner wall, a flanged end extending outward from the open female end, and a second external circular shaped rib extending outward from the housing to a predetermined diameter between the female end flange and first external circular shaped rib;
    an ultra-violet resistant polyvinylchloride water line fitting comprising a central longitudinal axis, first and second open ends, a cylindrically-shaped inner wall of diameter sized to the smaller housing inner wall diameter defining a fitting interior extending between the first and second open ends, with one open end inner wall further comprising screw threads for a predetermined length of the inner wall defining a fitting female open end;

a water line fitting exterior comprising a central longitudinal axis, a male end sized to be insertably received into the housing female open end, further comprising an external circular shaped rib extending outward from the fitting male end exterior surface to a predetermined diameter about the central longitudinal axis and a circular recess extending inward from the male end surface between the external circular shaped rib and the open end corresponding to the male end sized to receive and secure an O-ring and an O-ring suitably sized for and disposed on the male end within the recess;

an ultra-violet resistant polyvinylchloride end sleeve for the housing comprising a central longitudinal axis, first and second open ends, connected first and second cylindrically-shaped inner walls of differing predetermined diameters about the central longitudinal axis defining the sleeve interior extending between the first and second open ends, wherein the larger open end is sized to receive and enclose the housing female end up to the second external circular shaped rib and the smaller open end is sized to receive and enclose the water line fitting exterior male end leaving sufficient space for the male end to freely move therein along the sleeve longitudinal axis;

a cylindrical end sleeve exterior comprising a semi-circular recess extending inwards and sized to receive and hold a clip, the recess further comprising two ends and two openings from the exterior through to the to the larger cylindrically-shaped inner wall, each opening at one end of the semi-circular recess;

a plurality of locking mechanisms spatially oriented equidistant one from the other along a plane perpendicular to the housing central longitudinal axis, wherein each mechanism comprises a detent head accessible from the housing exterior and a deformable lock tab having elastic memory accessible from the housing larger interior wall at a predetermined distance from the housing female open end whereby when the water line fitting is insertably fitted into the housing female end the circular shaped rib communicates with the lock tabs and is thereby locked into the housing and the O-ring communicates with the annular tapered interior wall, and each detent head comprises a recess sized to receive a resilient detent locking spring;

a resilient detent locking spring; and an arcuate resilient clip sized to be received into and reside in the sleeve exterior recess, the clip further comprising two arms sized to extend through the sleeve and securely engage the housing exterior;

whereby the assembled connector fitting is rated to water pressures up to 250 pounds per square inch and the housing threaded male end and water line fitting threaded female end are adapted to fit varying diameter dimensions for pressurized watering systems.

2. A quick-release connector fitting comprising in combination:

a housing comprising first and second open ends, first and second cylindrically-shaped inner walls of differing predetermined diameters about a central longitudinal axis and an annular tapered interior connecting the first and second cylindrically-shaped inner walls defining a housing interior extending between the first and second open ends;

a housing exterior comprising a central longitudinal axis with a female end corresponding to the larger cylindrically-shaped inner wall and a threaded male end corresponding to the smaller cylindrically-shaped inner wall, a first external circular shaped rib extending outward from the housing to a predetermined diameter about the central longitudinal axis adapted to correspond to the boundary between the annular tapered interior wall and the smaller cylindrically-shaped inner wall, a flanged end extending outward from the open female end, and a second external circular shaped rib extending outward from the housing, to a predetermined diameter from the central longitudinal axis and positioned between the female end flange and first external circular shaped rib;

a water line fitting comprising first and second open ends, a cylindrically-shaped inner wall of diameter sized to receive the smaller housing inner wall diameter defining a fitting interior extending between the first and second open ends having a central longitudinal axis, with one open end inner wall further comprising screw threads along a predetermined length of the inner wall defining a fitting female open end; a water line fitting exterior comprising a male end sized to be insertably received into the housing female open end, further comprising an external circular shaped rib extending outward from the fitting male end exterior surface to a predetermined diameter about a central longitudinal axis and a circular recess extending inward from the male end surface between the external circular shaped rib and the open end corresponding to the male end sized to receive and secure an O-ring and an O-ring suitably sized for and disposed on the male end within the recess;

an end sleeve for the housing comprising first and second open ends, connected first and second cylindrically-shaped inner walls of differing predetermined diameters about a central longitudinal axis defining the sleeve interior extending between the first and second open ends, wherein the larger open end is sized to receive and enclose the housing female end up to the second external circular shaped rib and the smaller open end is sized to receive and enclose the water line fitting exterior male end leaving sufficient space for the male end to freely move therein along the sleeve longitudinal axis;

a cylindrical end sleeve exterior comprising a semi-circular recess extending inwards and sized to receive and hold a clip, the recess further comprising two ends and two openings from the exterior through to the larger cylindrically-shaped inner wall, each opening at one end of the semi-circular recess;

a plurality of locking mechanisms spatially oriented equidistant one from the other along a plane perpendicular to the central longitudinal axis, wherein each mechanism comprises a detent head accessible from the housing exterior and a deformable lock tab having elastic memory accessible from the housing larger interior wall at a predetermined distance along the central longitudinal axis from the housing female open end, whereby when the water line fitting is insertably fitted into the housing female end, the circular shaped rib communicates with the lock tabs and is thereby locked into the housing, and the O-ring communicates with the annular tapered interior wall, and each detent head comprises a recess sized to receive a resilient detent locking spring, and a resilient detent locking spring; and means for locking the end sleeve onto the housing and water line fitting connection.

3. The apparatus of claim 2, wherein the means for locking the end sleeve onto the housing and water line fitting connection comprises an arcuate resilient clip sized to be received into and reside in the sleeve exterior recess, the clip further comprising two arms sized to extend through the sleeve and securely engage the housing exterior.

4. The apparatus of claim 2 wherein the housing, the water line fitting, and the sleeve comprise materials selected from the group consisting of ultra-violet resistant polyvinylchloride, polyethersulfones, polyetherketones, brass, and copper.

5. The apparatus of claim 2 wherein the smaller housing interior inner wall and corresponding water line fitting inner wall comprise diameters selected from the group consisting of ¾ inch, 1 inch, 1½ inch, 2 inch, 20 mm, 25 mm, 40 mm, and 50 mm.

6. The apparatus of claim 5 wherein the water line fitting inner walls comprise diameters of ¾ inch, 1 inch, 20 mm, and 25 mm, the water line connector main fitting connection and all fitted elements of the apparatus are rated up to 150 pounds per square inch.

7. The apparatus of claim 5 wherein the water line fitting inner walls comprise diameters of 1½ inch, 2 inch, 40 mm, and 50 mm, the water line connector main fitting connection and all fitted elements are rated up to 250 pounds per square inch.

* * * * *